Oct. 21, 1930.  W. H. BARRIÈRE  1,779,082
NIGHT LUNCH CART OR DINER
Filed Oct. 3, 1927  2 Sheets-Sheet 1

Oct. 21, 1930.    W. H. BARRIÈRE    1,779,082
NIGHT LUNCH CART OR DINER
Filed Oct. 3, 1927    2 Sheets-Sheet 2

Inventor
Wilfred H. Barriere
By Attorneys
Southgate Hay & Hawley

Patented Oct. 21, 1930

1,779,082

UNITED STATES PATENT OFFICE

WILFRID H. BARRIÈRE, OF WORCESTER, MASSACHUSETTS

NIGHT LUNCH CART OR DINER

Application filed October 3, 1927. Serial No. 223,538.

This invention relates to improvements in vehicles of the general type commonly designated as "night lunch-carts" or "diners". In such vehicles, provision is made for cooking and serving food in somewhat limited quarters.

It is the object of my invention to improve the construction of such vehicles in several important respects.

One feature of my invention relates to the provision of an improved construction for the top or roof of such a vehicle by which the ventilation is improved, the interior is kept cooler in summer, and the condensation of moisture within the vehicle is reduced or eliminated.

Another feature of my invention relates to improvements in the floor plan of the vehicle, by which the working space is effectively increased by a relatively small increase in actual floor space.

My invention further relates to arrangements and combinations of parts which will be hereinafter described and more particularly pointed out in the appended claims.

A preferred form of the invention is shown in the drawings in which

Figure 1:
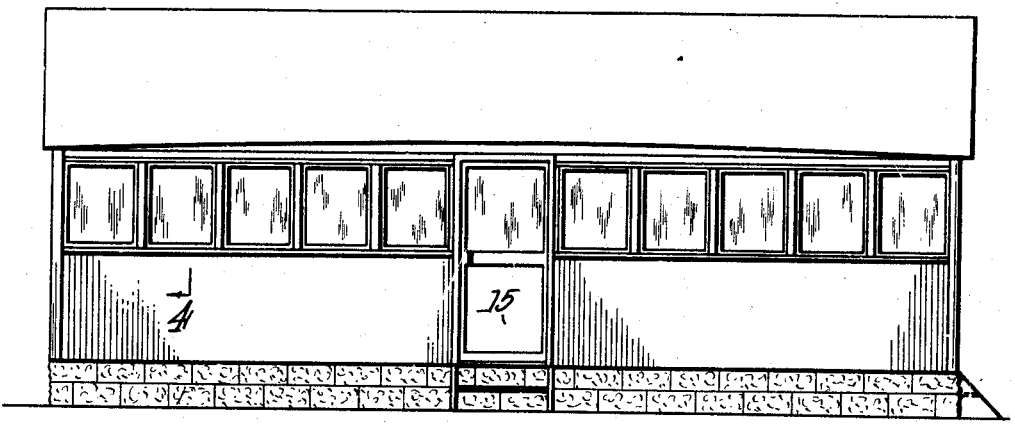
Fig. 1 is a front elevation of my improved lunch-cart or diner.
Figure 2:
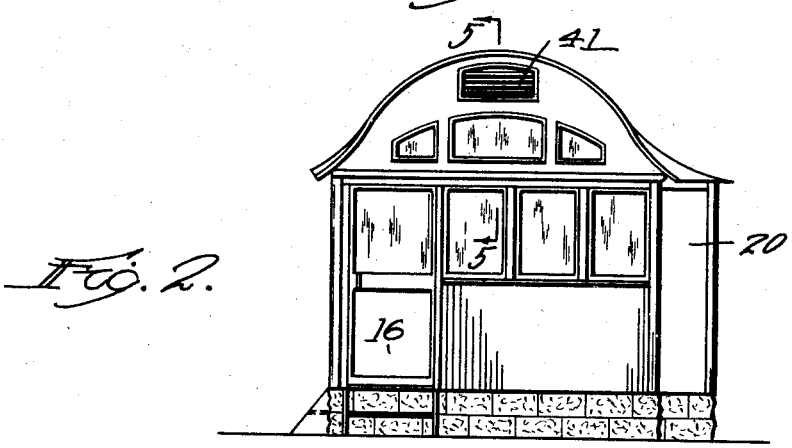
Fig. 2 is an end elevation thereof.

Referring to the drawings, I have shown a lunch-cart or diner which is in general of a familiar type and comprises a body portion made in the form of a cart or vehicle. Such a body may be mounted upon wheels so that it is literally a movable car or in some instances the wheels are omitted and the body is placed directly upon a more or less permanent foundation, as shown in Figs. 1 and 2. In any case, however, the body is a unitary structure which may be transported from place to place and suitably supported in a desired location.

Figure 3:
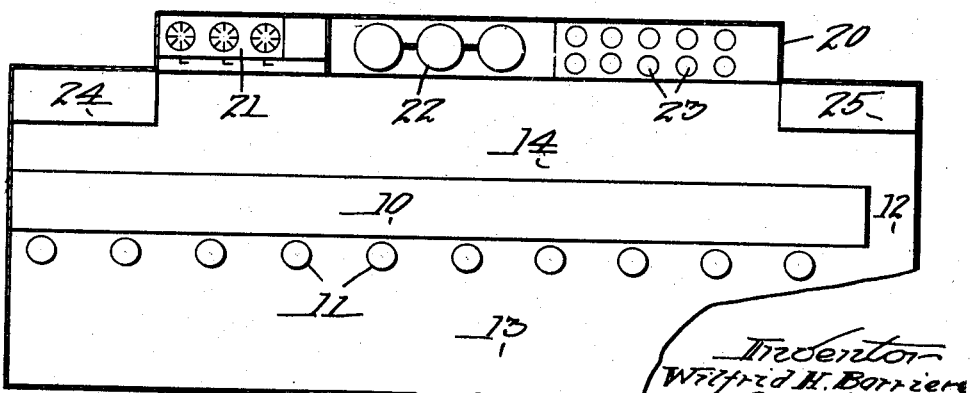
Fig. 3 is a sectional plan view.

The general arrangement of the interior, as indicated in Fig. 3, comprises a counter 10 extending nearly the entire length of the cart and having a number of seats 11 positioned adjacent thereto for the use of the customers. A narrow passage 12 around the end of the counter 10 connects the public space 13 in front of the counter with the working space 14 at the rear of the counter. A door 15 is provided in the front of the cart and a second door 16 (Fig. 2) may be provided at the end of the cart. As thus far described, the cart is of the usual and well known construction.

I have provided a new arrangement of floor plan, however, by which the working space 14 is effectively increased. For this purpose I provide a rearward extension 20 for a considerable portion of the length of the cart, this extension being of sufficient depth to receive the stove 21, coffee and water heaters 22, and heated receptacles 23 for the storage of food. A refrigerator 24 and shelf or table 25 may be provided at the ends of the cart. By thus placing the stove, heaters, and heated receptacles in the extension 20, the working space at the rear of the counter 10 is substantially doubled, with a comparatively small increase in the floor space by the addition of the extension thereto.

Figure 4:
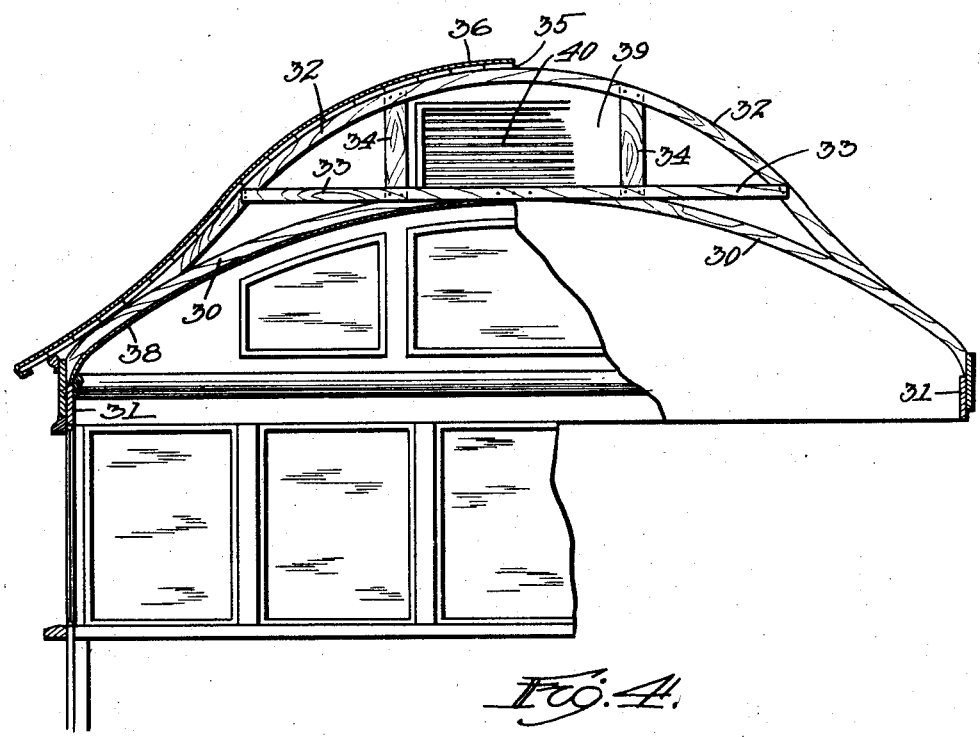
Fig. 4 is an enlarged partial sectional end elevation, taken along the line 4—4 in Fig. 1, and showing the roof construction.
Figure 5:
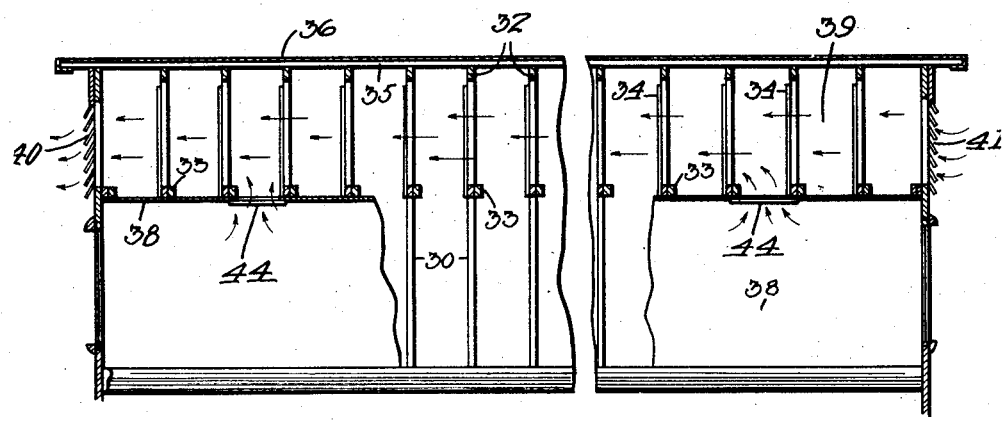
Fig. 5 is a partial sectional front elevation, taken along the line 5—5 in Fig. 2.

In Figs. 4 and 5, I have shown a special roof construction by which important improved results are attained. In my improved construction, I provide an inner series of upwardly curved supports or arches 30 (Fig. 4), supported at their ends on the top frames 31 of the front and rear walls. I also provide an outer series of upwardly curved arches 32 having a more abrupt curvature than the arches 30 and extending to a substantially greater height at the center of their length. These arches also are supported upon the tops of the front and rear walls.

Cross braces 33 connect the middle portions of the arches 30 with intermediate portions of the arches 32, and upright members 34 connect the braces 33 to the upper arches 32 at additional points.

Any suitable roof material, such as sheathing 35 and an outer layer 36 of canvas or other sheet material, may be placed on the upper arches 32 to form the outer roof of the lunch-cart. Similarly, a suitable sheathing or covering 38 may be secured to the under side of the lower arches 30, thus providing a finished surface or ceiling for the interior of the roof and also providing a substantial air space 39 between the outer roof and the inner ceiling.

Slatted openings 40 and 41 are preferably provided at the two ends of the air space 39 so that air may enter through one of the openings and pass out through the other opening, depending primarily upon the direction of the wind. This circulation of air between the inner and outer coverings causes the interior of the vehicle to be much cooler in summer, as very little direct heat of the sun can enter through the roof on account of the intervening air space 39, through which currents of air are constantly circulating.

I have also found that the provision of the inner ceiling 38, separated from the outer roof, by the air space 39, prevents the condensation of moisture on the ceiling, which is prevalent and annoying in carts having only a single roof layer.

In Fig. 5, I have also indicated the provision of ventilating openings 44 from the interior of the car to the air space 39 between the ceiling and the outer roof. These ventilators may be used or omitted as desired, but when used they increase the circulation of air through the vehicle and provide additional ventilation therefor. The currents of air passing through the air space 39 above the ceiling 38 render the ventilators 44 unusually effective when used.

It will be noted that the air space is of maximum height at the center of the vehicle, but that it tapers away at the front and rear edges of the roof so that the conventional appearance of the vehicle is substantially unchanged.

Having thus described my invention and the advantages thereof, I do not wish to be limited to the details herein disclosed otherwise than as set forth in the claims, but what I claim is:—

1. A diner having a roof structure comprising a series of inner arched members and a series of outer arched members, cross braces connecting said inner and outer arched members in associated pairs, and additional bracing members connecting said cross braces to said upper arched members, all of said arched members being supported at substantially the same elevation at their end portions, said two series of said members being substantially spaced apart vertically at their middle portions, and said members being provided with ceiling and roof layers enclosing a heat-insulating air space between said ceiling and roof layers, and means to establish communication between said space and the exterior of the diner.

2. A diner having a roof structure comprising a series of inner arched members and a series of outer arched members, cross braces connecting said inner and outer arched members in associated pairs, and additional bracing members connecting said cross braces to said upper arched members, all of said arched members being supported at substantially the same elevation at their end portions, said two series of said members being substantially spaced apart vertically at their middle portions, and said members being provided with ceiling and roof layers enclosing a heat-insulating air space between said ceiling and roof layers, and means to establish communication between said space and the interior of the diner.

3. A diner having a roof structure comprising a series of inner arched members and a series of outer arched members, cross braces connecting said inner and outer arched members in associated pairs, and additional bracing members connecting said cross braces to said upper arched members, all of said arched members being supported at substantially the same elevation at their end portions, said two series of said members being substantially spaced apart vertically at their middle portions, and said members being provided with ceiling and roof layers enclosing a heat-insulating air space between said ceiling and roof layers, means to establish communication between said space and the exterior of the diner, and means to establish communication between said space and the interior of the diner.

4. A diner having a roof structure comprising a series of inner arched members and a series of outer arched members, cross braces connecting said inner and outer arched members in associated pairs, all of said members being supported at substantially the same elevation at their end portions but said two series of members being substantially spaced apart vertically at their middle portions, and said members being provided with ceiling and roof layers enclosing a heat-insulating air space between said ceiling and roof layers, and separate means to establish communication between said air space and the interior and also the exterior of the diner.

In testimony whereof I have hereunto affixed my signature.

WILFRID H. BARRIÈRE.